(12) United States Patent
Albers

(10) Patent No.: US 11,078,880 B2
(45) Date of Patent: Aug. 3, 2021

(54) REMOTE ENGINE START SYSTEM AND METHOD

(71) Applicant: Continental Automotive GmbH, Hannover (DE)

(72) Inventor: Heiko Albers, Hannover (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/493,689

(22) PCT Filed: Mar. 12, 2018

(86) PCT No.: PCT/EP2018/056031
§ 371 (c)(1),
(2) Date: Sep. 12, 2019

(87) PCT Pub. No.: WO2018/166952
PCT Pub. Date: Sep. 20, 2018

(65) Prior Publication Data
US 2020/0132033 A1 Apr. 30, 2020

(30) Foreign Application Priority Data
Mar. 14, 2017 (DE) .................... 10 2017 204 219.2

(51) Int. Cl.
*F02N 11/08* (2006.01)
*B60R 25/20* (2013.01)
*B60R 16/023* (2006.01)
(52) U.S. Cl.
CPC ...... *F02N 11/0807* (2013.01); *B60R 16/0232* (2013.01); *B60R 25/209* (2013.01); *F02N 11/0848* (2013.01)

(58) Field of Classification Search
CPC ............. F02N 11/0807; F02N 11/0848; B60R 25/209; B60R 16/0232
(Continued)

(56) References Cited

U.S. PATENT DOCUMENTS 4,236,594 A * 12/1980 Ramsperger ........ F02N 11/0807
123/179.2
6,321,150 B1 11/2001 Nitta
(Continued)

FOREIGN PATENT DOCUMENTS

| CN | 101470440 A | 7/2009 |
|---|---|---|
| DE | 69932019 T2 | 11/2006 |

(Continued)

OTHER PUBLICATIONS

Vector Informatik; "Automobil Elektronik"; Published Feb. 1, 2013.
(Continued)

*Primary Examiner* — Mahmoud Gimie

(57) ABSTRACT

A remote engine start system, comprising an engine start unit and a control unit is disclosed. The engine start unit is arranged in a vehicle and configured to receive signals from a remote control. The vehicle comprises a drive motor. The engine start unit is configured to initiate the start of the drive motor upon receipt of a signal from the remote control. The control unit is configured to monitor the function of the engine start unit, and to detect errors in the function of the engine start unit. The remote engine start system is configured to prevent the starting of the drive motor once an error in the function of the engine start unit was detected, and to initiate the turning off of the drive motor, if the drive motor is turned on and an error in the function of the engine start unit was detected.

8 Claims, 3 Drawing Sheets

Figure 1:
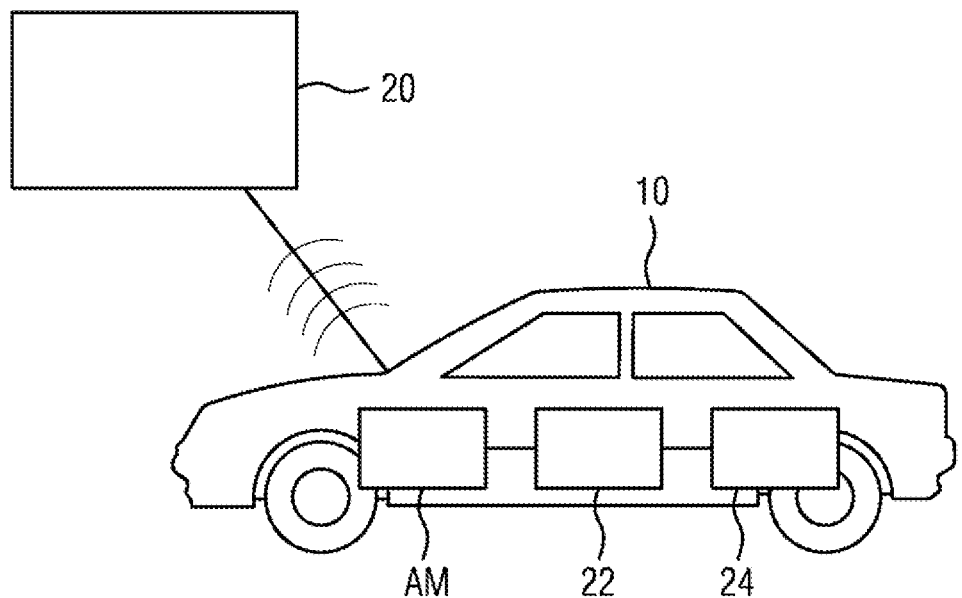

(58) Field of Classification Search
USPC .................................................. 123/179.2
See application file for complete search history.

(56) References Cited

U.S. PATENT DOCUMENTS

| | | |
|---|---|---|
| 2005/0179322 A1 | 8/2005 | Flick |
| 2006/0095197 A1* | 5/2006 | Nishi ............... F02N 11/10 701/113 |
| 2006/0244626 A1* | 11/2006 | Beyene ............ F02N 11/101 340/6.1 |
| 2008/0129473 A1 | 6/2008 | Tsuruta et al. |
| 2009/0265048 A1* | 10/2009 | Ono ................. B60R 25/04 701/2 |
| 2010/0023199 A1 | 1/2010 | Weichenberger et al. |
| 2014/0095057 A1* | 4/2014 | Takahashi ........... F02D 17/04 701/112 |
| 2014/0379174 A1 | 12/2014 | Holub et al. |

FOREIGN PATENT DOCUMENTS

| | | |
|---|---|---|
| DE | 102008014511 A1 | 9/2009 |
| DE | 102015114399 A1 | 3/2016 |
| DE | 102015215847 B3 | 11/2016 |
| KR | 20040076431 A1 | 9/2004 |
| WO | 2008/014940 A1 | 2/2008 |
| WO | 2012/139638 A1 | 10/2012 |

OTHER PUBLICATIONS

International Search Report and Written Opinion dated Jun. 8, 2018 from corresponding International Patent Application No. PCT/EP2018/056031.

* cited by examiner

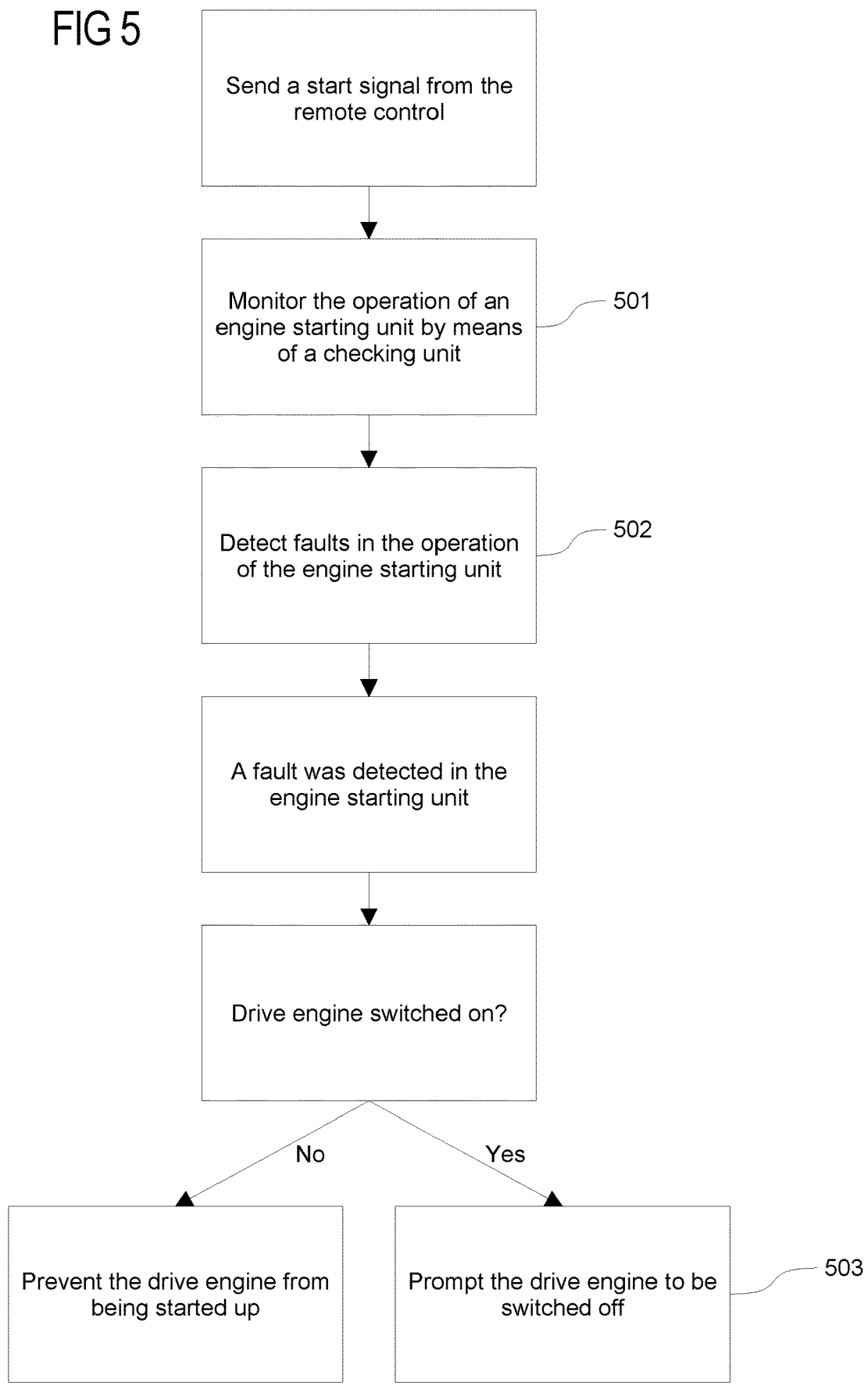

REMOTE ENGINE START SYSTEM AND METHOD

The invention relates to a remote engine starting system and a method, in particular a system and a method for remotely starting the drive engine in a vehicle.

Remote engine starting systems are known that permit a vehicle to be started by using a remote control. In this manner, it is possible for vehicles to be started without a user being in-side or in direct proximity to the vehicle. The remote engine starting function normally permits a vehicle to be started from a distance of up to 100 m or more.

When faults occur in this case, dangerous or even life-threatening situations can arise. In the event of faults in the hardware or the software of the system, the engine of a vehicle can run in an uncontrolled manner on an ongoing basis. In so doing, the vehicle produces exhaust gases. In particular if the vehicle is in an enclosed space, such as for example in a closed garage, the exhaust gases can lead to people who are in proximity to the vehicle being poisoned.

It is therefore an object of the invention to provide an improved remote engine starting system and an improved method for remotely starting an engine that can better avoid dangerous situations.

A remote engine starting system has an engine starting unit and a checking unit. The engine starting unit is arranged in a vehicle and is designed to receive signals from a remote control, wherein the vehicle has a drive engine and the engine starting unit is furthermore designed to prompt the drive engine to be started up when a signal has been received from the remote control. The checking unit is designed to monitor the operation of the engine starting unit and to detect faults in the operation of the engine starting unit. The remote engine starting system is designed to prevent the drive engine from being started when a fault has been detected in the operation of the engine starting unit and to prompt the drive engine to be switched off if the drive engine is switched on and a fault has been detected in the operation of the engine starting unit.

In the event of faults in the operation of the remote engine starting system, in particular the engine starting unit, this can prevent the drive engine of the vehicle from being started, or an already started drive engine can be shut down when faults are detected in the remote engine starting system.

The engine starting unit can have a microcontroller and the checking unit can be designed to monitor the operation of the microcontroller. The microcontroller can perform different functions of the engine starting unit, such as for example prompting the drive engine to be started. In particular the operation of the microcontroller can be important to the operation of the remote engine starting system in this case.

The checking unit can have a status unit designed to store a present state of the drive engine.

The status unit can have a flipflop, for example. A flipflop can be used to store states very easily.

The flipflop can assume a first state when the drive engine has been started. The first state can be prevented from being reset if the drive engine of the vehicle is switched on and a fault has been detected in the operation of the engine starting unit. Therefore, the state of the flipflop is not changed if the drive engine is switched on and during this a fault is detected in the operation of the engine starting unit.

The remote engine starting system can be designed to switch off the drive engine when a fault has been detected in the operation of the engine starting unit and the flipflop has the first state. The monitoring and switching-off of the drive engine can thus be implemented in a relatively simple manner.

The checking unit can have a monitoring unit, wherein the monitoring unit is designed to output a fault signal when a fault has been detected in the operation of the engine starting unit.

A remote engine starting system has an engine starting unit and a checking unit, wherein the engine starting unit is arranged in a vehicle and is designed to receive a signal from a remote control, and wherein the vehicle has a drive engine and the engine starting unit is furthermore designed to prompt the drive engine to be started up when a signal has been received from the remote control. A method for operating a remote engine starting system involves monitoring the operation of the engine starting unit by means of the checking unit, detecting faults in the operation of the engine starting unit, and preventing the drive engine from being started when a fault has been detected in the operation of the engine starting unit, or prompting the drive engine to be switched off if the drive engine is switched on and a fault has been detected in the operation of the engine starting unit.

Figure 2:
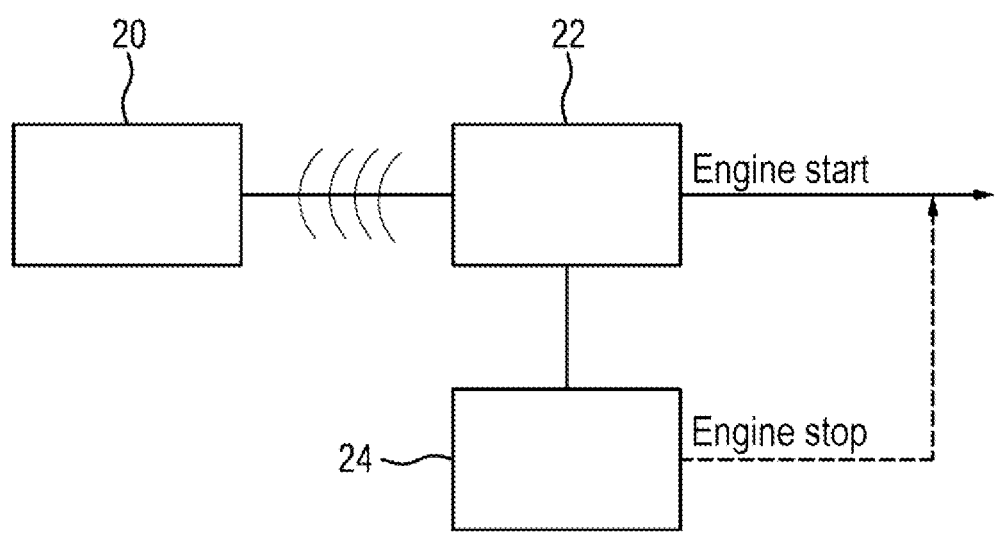
Figure 3:
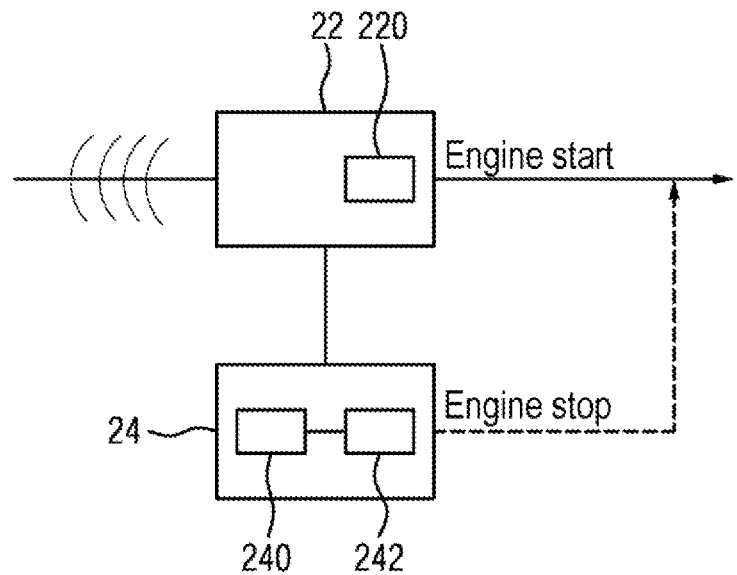
Figure 4:
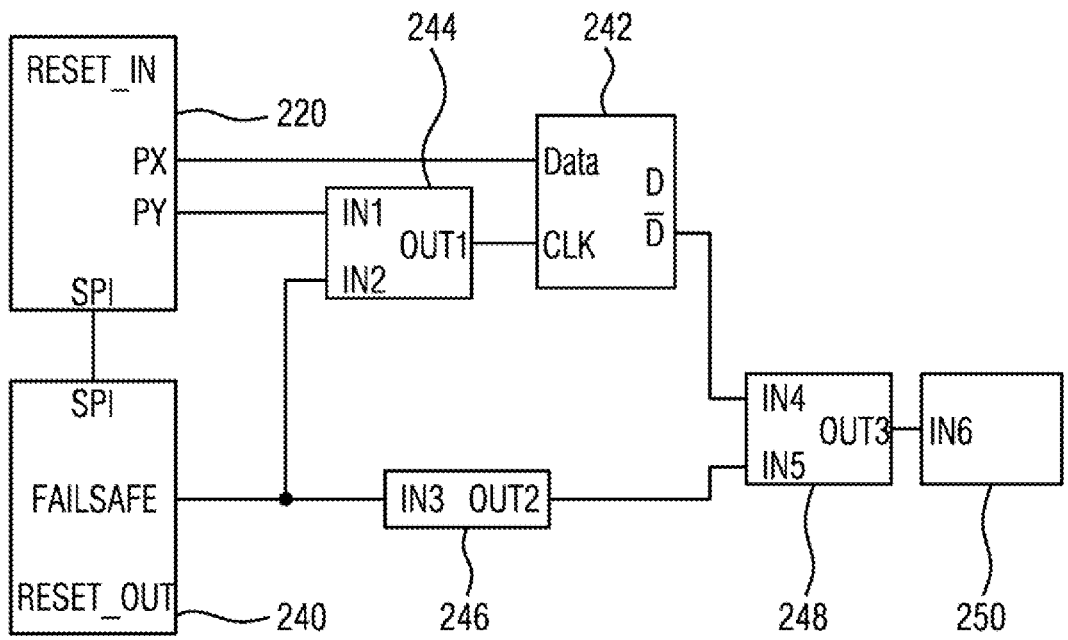

The invention is explained more specifically below on the basis of the figures of the drawing, wherein identical or similar elements are provided with the same reference signs. In the drawing:

FIG. 1 uses an outline depiction to show the principle of a remote engine starting system, FIG. 2 uses an outline depiction to show a remote engine starting system according to an embodiment of the present invention, FIG. 3 uses an outline depiction to show a further remote engine starting system according to an embodiment of the present invention, FIG. 4 uses an outline depiction to show a further remote engine starting system according to an embodiment of the present invention, and FIG. 5 uses a flowchart to show a method for remotely starting a vehicle according to an embodiment of the invention.

FIG. 1 shows, by way of example, a remote engine starting arrangement or a remote engine starting system for a vehicle 10. The remote engine starting system has a remote control 20. A user of the vehicle 10 can carry the remote control 20 with him. Even if the user is not inside the vehicle 10 or in the immediate surroundings of the vehicle 10, he can operate the remote control 20 in order to trigger starting of the drive engine AM of the vehicle 10. This means that when the user operates a key (not depicted) on the remote control 20, for example, an applicable signal is sent to the vehicle 10. A control unit (not depicted) in the vehicle 10 can receive and evaluate the signal and subsequently trigger starting of the vehicle 10. In particular, this can involve the drive engine AM of the vehicle 10 being started. The drive engine can have an internal combustion engine, such as for example a diesel engine or a petrol engine.

In this manner, for example various functions can already be activated even though the user is not yet in proximity to the vehicle 10. By way of example, when the drive engine is started, the air conditioning system can begin to run. As such, the interior of the vehicle 10 can already be cooled or heated before the user gets to his vehicle 10. This is merely an example, however. It is possible for any other functions, in particular for example comfort functions, to be activated as soon as the vehicle 10 has been started.

Signals between the remote control 20 and the vehicle 10 can be transmitted by radio or via a mobile radio network, for example. By way of example, vehicles are known in which a portable electronic device, such as for example a smartphone, can act as a vehicle key 20. The portable electronic device can have a connection to a mobile radio network, for example, as can the vehicle 10. The mobile radio network can be used by the portable electronic device and the vehicle 10 to communicate with one another.

Referring to FIG. 2, a remote engine starting arrangement or a remote engine starting system is depicted in exemplary fashion and in more detail than in FIG. 1. The remote engine starting system has an engine starting unit 22 (see also FIG. 1) that is arranged in the vehicle 10. The engine starting unit 22 is designed to receive (engine start) signals from a remote control 20. When the vehicle 10, or the engine starting unit 22, receives the signals, this results in the drive engine AM being started up (engine start). The remote engine starting system furthermore has a monitoring unit or checking unit 24. The checking unit 24 is likewise arranged in the vehicle 10 (in this regard see also FIG. 1) and is designed to monitor the operation of the engine starting unit 22 and to detect faults in the operation of the engine starting unit 22. When the checking unit 24 detects a fault in the operation of the engine starting unit 22, the checking unit 24 can prompt the drive engine to be switched off (engine stop). This can prevent the drive engine from running in an uncontrolled manner on an ongoing basis in the event of disorders in the engine starting unit 22.

However, it is also possible for the drive engine to be prevented from being started, or started up, when a disorder has been detected in the operation of the engine starting unit 22 that still exists at the time at which the engine start is meant to be performed.

By way of example, the remote control 20 can have at least one key (not depicted). By way of example, the remote control can then transmit signals to the vehicle 10 when a user operates the key. When these signals are received by the engine starting unit 22 in the vehicle 10, the engine start can be performed provided that this is not prevented by the checking unit 24.

The engine starting unit 22 normally has various electronic devices for providing the functions. A disorder in the engine starting unit 22 can for example exist if at least one of these electronic devices is not working properly and hence at least one function is faulty.

As depicted in FIG. 3, the engine starting unit 22 can have a microcontroller 220, for example. The microcontroller 220 is designed to control various functions of the engine starting unit 22. If the microcontroller 220 is not operating properly, then the functions of the engine starting unit 22 are also possibly no longer carried out properly. Therefore, according to one embodiment, in particular the operation of the microcontroller 220 can be monitored by the checking unit 24. However, it is alternatively or additionally also possible for other components (not depicted in FIG. 3) of the engine starting unit 22 to be monitored. The checking unit 24 can have a monitoring unit 240 and a status unit 242. The status unit 242 can be used to store for example the present state of the drive engine of the vehicle 10 (drive engine ON or drive engine OFF). When the engine starting unit 22 prompts the drive engine to be started, the status unit 242 can buffer-store this state (e.g. drive engine ON). If the monitoring unit 240 subsequently detects a malfunction in the engine starting unit 22, or in the microcontroller 220, the drive engine can be prompted to be switched off in different ways. By way of example, the checking unit 24 can transmit an engine stop signal. The transmission of an engine stop signal results in the drive engine being switched off (ignition off).

By way of example, the monitoring unit 240 can be designed to read the present state buffer-stored in the status unit 242. When a fault has been detected in the operation of the engine starting unit 22 and at the same time the drive engine is operating (state: drive engine ON), the monitoring unit 240 can transmit an engine stop signal or prompt an engine stop signal to be transmitted by another unit (e.g. a separate transmission unit, not depicted).

However, it is also possible for the monitoring unit 240 to output a fault signal to the status unit 242 when a fault has been detected in the operation of the engine starting unit 22. When the status unit 242 receives such a fault signal and the state "drive engine ON" is stored in the status unit 242, the status unit 242 can transmit an engine stop signal, or prompt an engine stop signal to be transmitted by another unit (e.g. a separate transmission unit, not depicted).

FIG. 4 shows a further possible embodiment of a remote engine starting system. The microcontroller 220 can output a signal at a data output PX, for example, in order to switch on the ignition and thereby to permit or prompt the drive engine to be started when a signal has been received from the remote control (not depicted in FIG. 4). This signal from the data output PX can be received at a data input Data of the status unit 242. The status unit 242 can have a flipflop, for example. The flipflop can be a D-type flipflop, for example. A D-type flipflop has a data input Data and a clock input CLK. Also, a D-type flipflop has an output D and a negated output $\bar{D}$. So long as a fault in the engine starting unit 22 has not been detected and the drive engine is switched on, the flipflop 242 can be in a first state (state "set"). This first state can be interpreted as D=1 (high) and $\bar{D}$=0 (low). If a fault in the engine starting unit 22, or in the microcontroller 220, is now detected, resetting of the flipflop by the microcontroller is blocked. This means that the flipflop is kept in the first state. In the reset second state, the values are present at the outputs in a transposed manner, that is to say D=0 (low) and $\bar{D}$=1 (high).

The monitoring unit 240 can be connected to the microcontroller 220 via a serial peripheral interface (SPI) and can monitor the operation of the microcontroller 220 via this interface. Other connections between the monitoring unit 240 and the microcontroller 220 are likewise possible, however, instead of the SPI. The monitoring unit 240 can continue to be connected via an output RESET_OUT to an input RESET_IN of the microcontroller 220, for example. This connection can be used by the monitoring unit 240 to perform a reset (restart) for the microcontroller 220.

The monitoring unit 240 can have a system basis chip (SBC), for example. The system basis chip can combine multiple functions. These functions can comprise a (window) watchdog, for example. When a fault in the microcontroller 220 is detected, the monitoring unit 240 can use a failsafe output to output a fault signal. This fault signal leads to possible resetting of the flipflop 242 to the second state by the microcontroller being blocked by a first failsafe unit 244. This means that the flipflop 242 is kept in the first state so long as the fault signal is present on the first failsafe unit 244. The first failsafe unit 244 can likewise be designed to prevent the first state of the drive engine (drive engine ON) from being buffer-stored if the microcontroller 220 is not working properly at this time and the monitoring unit 240 outputs a corresponding fault signal.

The fault signal can furthermore be sent to a logic unit 248 via a second failsafe unit 246. By way of example, the second failsafe unit 246 can be designed to generate a failsafe signal from the fault signal, which failsafe signal is sent to the logic unit 248. A first input IN4 of the logic unit 248 can be connected to the negated output $\overline{D}$ of the status unit 242. A second input IN5 of the logic unit 248 can be connected to the output OUT2 of the second failsafe unit 246. The two inputs of the logic unit 248 can be appropriately logically combined with one another such that the logic unit 248 changes a state at its output OUT3 if the drive engine is switched on (state: drive engine ON) and a fault in the microcontroller 220 has been detected. An engine stopping unit 250 detects a change in the state at the output of the logic unit 248. When the engine stopping unit 250 detects an applicable change, it can prompt the drive engine to be shut down by prompting the ignition to be switched off. By way of example, the engine stopping unit 250 can generate an engine stop signal or can prompt an engine stop signal to be transmitted by a transmission unit (not depicted).

The arrangement in FIG. 4 is merely one possible example, however. A checking unit 24 can be realized in any suitable other manner.

FIG. 5 uses a flowchart, in an exemplary manner, to show a method for operating a remote engine starting system. A remote engine starting system can have an engine starting unit 22 and a checking unit 24, wherein the engine starting unit 22 is arranged in a vehicle 10 and is designed to receive a signal from a remote control, wherein the vehicle 10 has a drive engine and the engine starting unit 22 is furthermore designed to prompt the drive engine to be started up when a signal has been received from the remote control. The method involves monitoring the operation of the engine starting unit 22 by means of the checking unit 24 (step 501). The method furthermore involves detecting faults in the operation of the engine starting unit 22 (step 502). The drive engine is prevented from being started when a fault has been detected in the operation of the engine starting unit 22, or the drive engine is prompted to be switched off if the drive engine is switched on and a fault has been detected in the operation of the engine starting unit 22 (step 503).

The invention claimed is:

1. A remote engine starting system for a vehicle comprising a drive engine, comprising:
    an on-vehicle engine starting unit configured to:
        receive at least one of radio and mobile radio network signals from a remote control, and
        prompt the drive engine to be started up when a signal was received from the remote control; and
    a checking unit configured to:
        monitor operation of the engine starting unit, and
        detect faults in the operation of the engine starting unit,
        prevent the drive engine from being started if it detects a fault in the operation of the engine starting unit, and
        prevent the drive engine from running in an uncontrolled manner on an ongoing basis by prompting the drive engine to be switched off if the drive engine is switched on and a fault was detected in the operation of the engine starting unit, the prompting of the drive engine to be switched off comprising transmitting an engine stop signal or prompting the engine stop signal to be transmitted by another unit;
    wherein the engine starting unit comprises a microcontroller and the checking unit is configured to monitor the operation of the microcontroller.

2. The system as claimed in claim 1, wherein the checking unit comprises a status unit configured to store a present state of the drive engine.

3. The system as claimed in claim 2, wherein the status unit comprises a flipflop.

4. The system as claimed in claim 3, wherein the flipflop assumes a first state when the drive engine was started and prevents the first state from being reset if the drive engine of the vehicle is switched on and a fault was detected in the operation of the engine starting unit.

5. The system as claimed in claim 4, wherein the remote engine starting system is configured to switch off the drive engine when a fault was detected in the operation of the engine starting unit and the flipflop has the first state.

6. The system as claimed in claim 1, wherein the checking unit comprises a monitoring unit, and wherein the monitoring unit is configured to output a fault signal when a fault was detected in the operation of the engine starting unit.

7. A method for operating a remote engine starting system for a vehicle comprising a drive engine, an engine starting unit for starting up the drive engine in response to the reception of at least one of radio and mobile radio network signals of a remote control, and a checking unit, comprising:
    monitoring the operation of the engine starting unit,
    detecting faults in the operation of the engine starting unit, and
    preventing the drive engine from being started when a fault was detected in the operation of the engine starting unit; or
    preventing the drive engine from running in an uncontrolled manner on an ongoing basis by prompting switching off the drive engine if the drive engine is switched on and a fault was detected in the operation of the engine starting unit, the prompting of the drive engine to be switched off comprising transmitting an engine stop signal or prompting the engine stop signal to be transmitted by another unit; wherein the monitoring the operation of the engine starting unit comprises monitoring the operation of a microcontroller comprised in the engine starting unit.

8. A checking unit configured to perform the method as claimed in claim 7.

* * * * *